(No Model.) 6 Sheets—Sheet 2.
C. L. F. MUELLER.
DYNAMO ELECTRIC MACHINE.

No. 325,619. Patented Sept. 1, 1885.

Witnesses:
Inventor:
Charles L. Fr. Mueller
By Stout & Underwood
Attorneys

N. PETERS, Photo-Lithographer, Washington, D. C.

(No Model.)  
C. L. F. MUELLER.  
DYNAMO ELECTRIC MACHINE.  
No. 325,619.  
6 Sheets—Sheet 3.  
Patented Sept. 1, 1885.
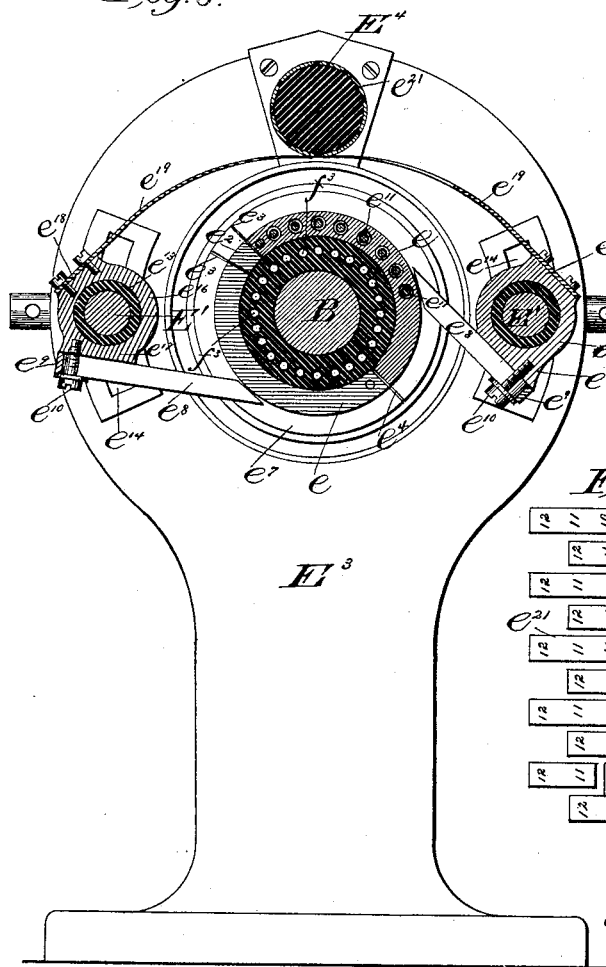
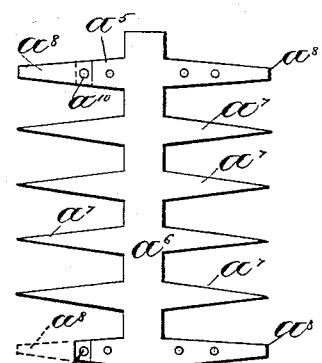
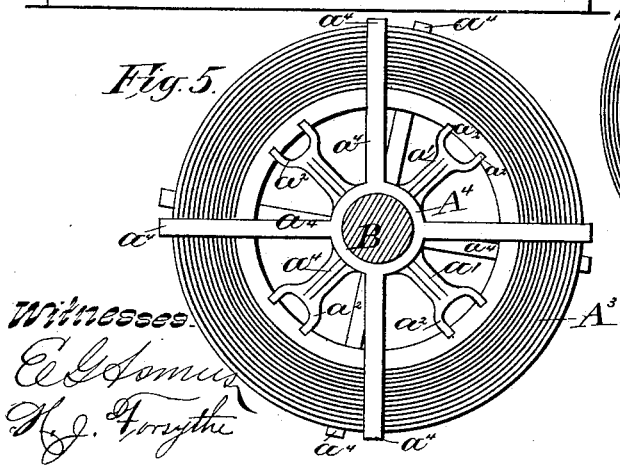
Witnesses  
Inventor:  
Charles L. F. Mueller  
By Stout & Underwood  
Attorneys.

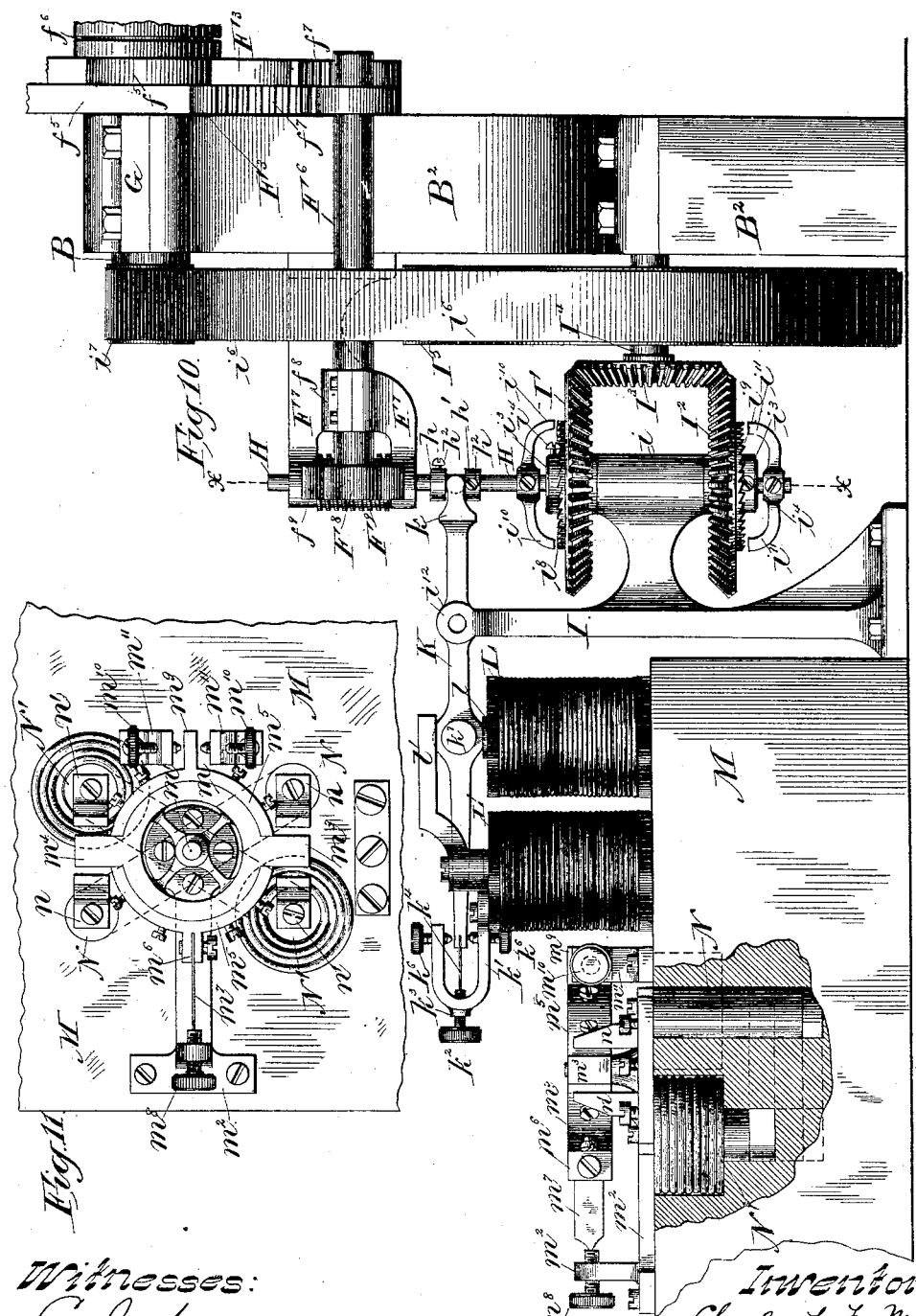

(No Model.) 6 Sheets—Sheet 5.
C. L. F. MUELLER.
DYNAMO ELECTRIC MACHINE.
No. 325,619. Patented Sept. 1, 1885.
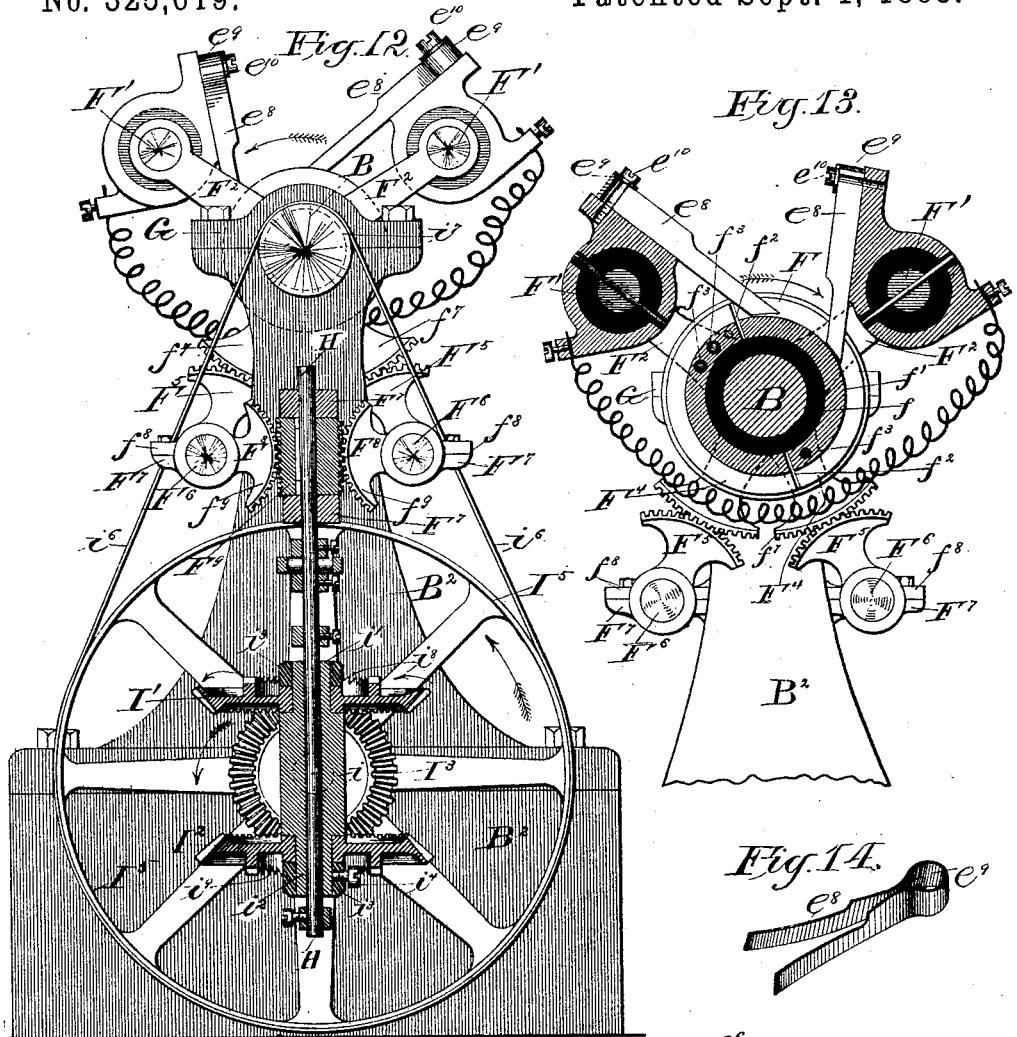
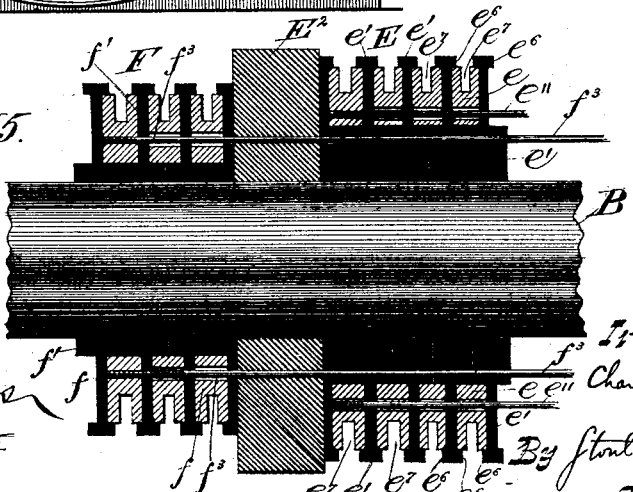
Witnesses
E. G. Amus
H. J. Forsythe
Inventor:
Charles L. F. Mueller
By Stout & Underwood
Attorneys.

(No Model.) 6 Sheets—Sheet 6.
C. L. F. MUELLER.
DYNAMO ELECTRIC MACHINE.
No. 325,619. Patented Sept. 1, 1885.
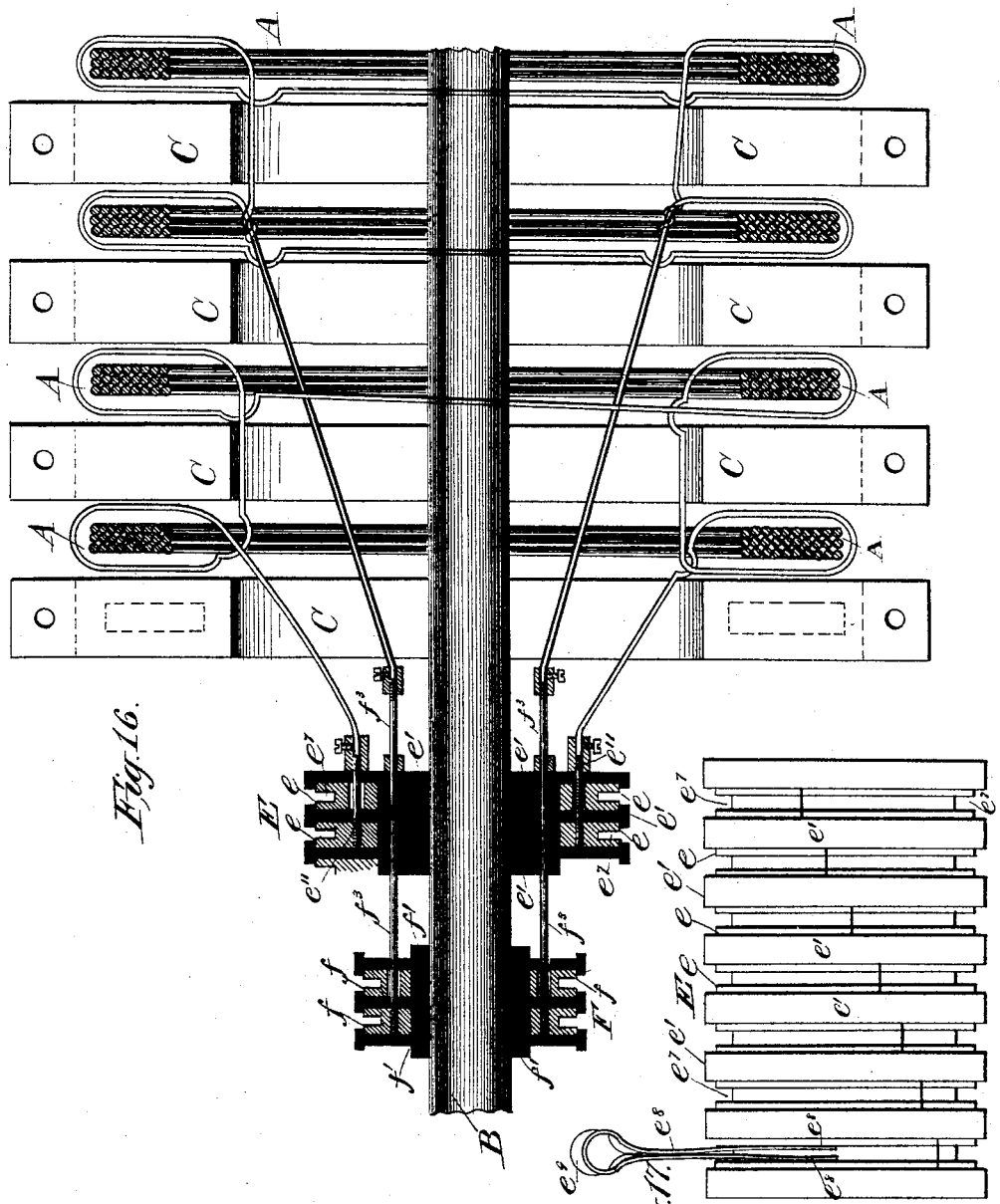
Witnesses:
Inventor:
Charles L. Fr. Mueller
By Stout & Underwood
Attorneys.

UNITED STATES PATENT OFFICE.

CHARLES L. FR. MUELLER, OF MILWAUKEE, WISCONSIN, ASSIGNOR OF ONE-HALF TO EMIL SCHANDEIN, OF SAME PLACE.

DYNAMO-ELECTRIC MACHINE.

SPECIFICATION forming part of Letters Patent No. 325,619, dated September 1, 1885.

Application filed June 18, 1884. (No model.)

*To all whom it may concern:*

Be it known that I, CHARLES L. FR. MUELLER, of Milwaukee, in the county of Milwaukee, and in the State of Wisconsin, have invented certain new and useful Improvements in Dynamo-Electric Machines; and I do hereby declare that the following is a full, clear, and exact description thereof.

My invention relates to improvements in dynamo-electric machines; and it consists in peculiarities of construction, as will be more fully described hereinafter.

Figure 1:
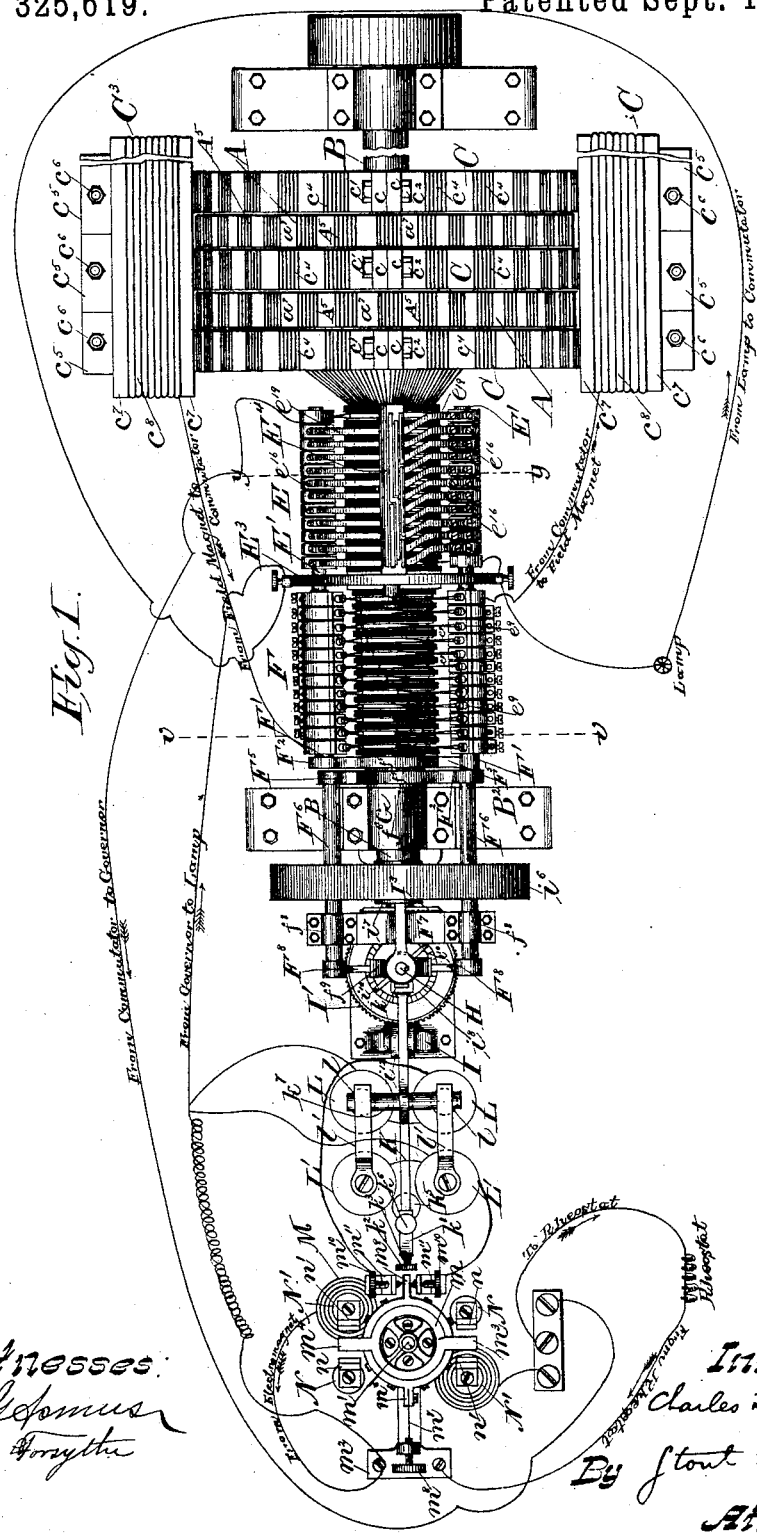
Figure 2:
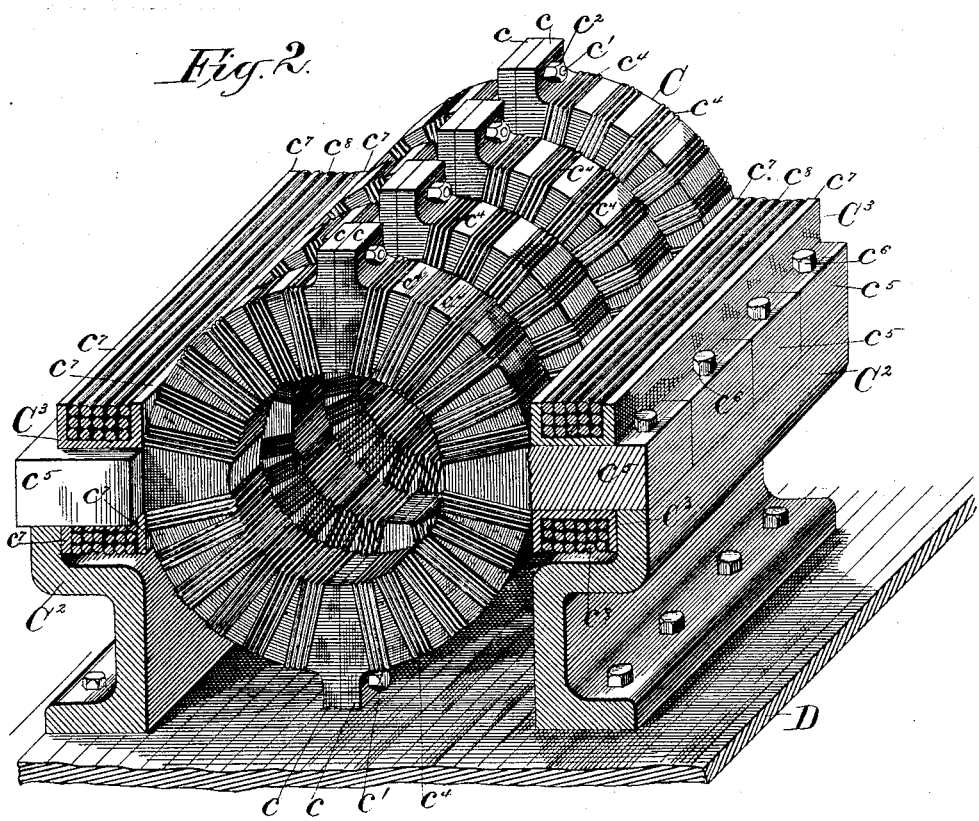
Figure 3:
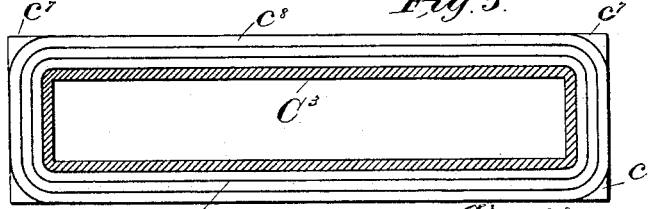
Figure 4:
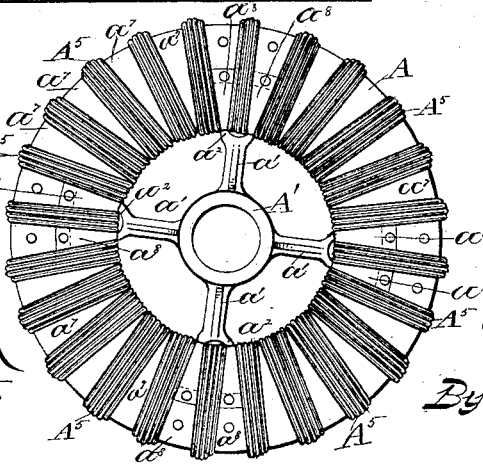

In the drawings, Figure 1 is a broken top view of my improved dynamo-electric machine. Fig. 2 is a perspective view of the field-magnet. Fig. 3 is a sectional view showing a detail of said field-magnet. Fig. 4 represents one of the armature-rings of my machine. Figs. 5, 6, 7 show details and manner of construction of the said armature-rings. Fig. 8 is a vertical section on line $y\,y$ of Fig. 1, and shows the construction of the general current-commutator and of the pachytrop. Fig. 9 is a diagram showing the arrangement of the connecting-plates of the pachytrop. Fig. 10 is an enlarged side view of part of my machine, illustrating the construction of the current-governor of the same. Fig. 11 is a top view of part of said governor. Fig. 12 is a vertical sectional view on line $x\,x$ of Fig. 10, showing the connection between the governor and the brushes of the field-magnet commutator. Fig. 13 is a similar section in rear elevation of the same on line $v\,v$ of Fig. 1. Fig. 14 is a perspective view of one of the commutator-brushes. Fig. 15 is a vertical central section through a portion of the commutators. Fig. 16 is a similar section through a portion of the revolving armature of the field-magnet and of the commutators, showing the connection of the wire-conductors of the armature with the rings of the commutator. Fig. 17 is a top view of one of the commutators, showing one brush in position.

The object of my invention is, first, to so construct the armature of a dynamo-electric machine as to bring it in the closest proximity with the largest possible surface of magnetic field; this is effected by composing said armature of a series of flat rings which are interposed and made to rotate between similarly-shaped parts of the field-magnets; second, to concentrate in the poles of the field-magnets the maximum of magnetism possible by making them of a series of circular plates arranged parallel with and on each side of the rings of the revolving armature; their diametrically opposite poles are simply united or else united to compact rectangular cores, and these as well as the circular plates themselves are surrounded with wire, thus forming two double poles and presenting the largest possible surface of magnetic field; thirdly, to construct an improved form of commutator for the exterior current, entirely separated in this machine from the field-magnet current, whereby through a simple manipulation of a peculiar mechanism called "pachytrop" the armature-conductors may be arranged in different combinations to produce more or less intensity or quantity; fourthly, to construct an improved form of commutator for the field-magnet current, permitting by a change in the position of the brushes to temporarily exclude part of the armature-conductors from activity, and to in this manner increase or diminish the power of the field-magnets in order to regulate the exterior current which depends on it; lastly, to produce a simple form of governor to execute said regulation.

Instead of a cylindrical armature, as is most generally used for dynamo-electric machines, I employ an armature consisting of a series of flat rings, A A A, forming a cylinder with ring-shaped spaces wherein are received the similarly-shaped parts C C C of the field-magnets. These rings A A, any number of which may be used on the same armature, consist of a hub, A', from which radially project the arms $a'\,a'\,a'$, having bifurcated ends $a^2\,a^2$. These latter fit in the notches $a^3\,a^3$, cut in the inner edge of a flat ring, $A^2$, around the outer edge of which are wound the coils of a soft-iron wire, $A^3$.

In Fig. 5 is shown the manner in which this wire coiling is effected. $A^4$ is a hub, from which radiate the arms $a^4\,a^4$, extending slightly beyond the intended diameter of the ring A, and which is set on each side of the above-described hub A', the wire is wound evenly between the arms $a^4\,a^4$, which are removed after the coiling, and the ring thus formed is kept firmly in place by means of the irregular-shaped clamping-segments $a^5\ a^5$, set in place around the same while yet hot. These segments, which are cut out of soft-iron plates of suitable thickness, are illustrated in Fig. 7. Their central portion, $a^6$, is bent around and covers one-fourth of the outer rim of the ring A, while the tongues $a^7\ a^7$ on each side of said central portion are bent at right angles to this latter to form the sides of the ring, their ends projecting slightly beyond the inner rim of the ring $A^2$. The tongue $a^8$ on each end of the segments $a^5\ a^5$ is cut slightly wider than the tongues $a^7\ a^7$, and these wide-ended tongues are made to coincide with the notches $a^3$, formed on the inner rim of the ring $A^2$, so as to hold in place in said notches the bifurcated ends $a^2$ of the arms $a'\ a'$, forming the central part of the ring A. In the radial spaces left between the tongues $a^7\ a^7\ a^8\ a^8$ of the segments $a^5\ a^5$ are wound the wire-conductors $A^5\ A^5\ A^5$, and, as, for convenience in winding the same, it is desirable to remove the central portion, $A'$, the end tongues, $a^8$, on one side of each segment are made with a detachable end, as shown in full and dotted lines, which is held in place after the said portion $A'$ has been inserted by means of a rivet or screw, $a^{10}$. The rectangular grooves formed in this manner around each of the armature-rings A A, and in which are wound in two or three layers the wire-conductors $A^5\ A^5$, are twenty-four in number, and the electricity produced in the revolving armature is distributed in two currents—the exterior current and the current of the field-magnets. This is done by employing a certain number of the armature-rings for the first and the remaining ones for the latter current. All the bobbins in each pair of diametrically-opposite rows parallel to the axis of the revolving armature which are set apart for the exterior current are connected in a single circuit. The two free ends of the conductor thus formed of each pair of bobbin rows are carried to a commutator, E, and attached to diametrically-opposite segments $e\ e\ e$, forming said commutator. So, also, all the bobbins in each pair of diametrically-opposite rows parallel to the axis of all the rings A that are reserved for the production of the current for the field-magnets are connected in such a manner that the first wire ends of the bobbins of each row, as well as the last wire ends of the same, are united to one wire, as if each conductor were divided in different branches going to the bobbins. The two free ends of the conductor thus formed are carried to a second commutator, F, and attached to the diametrically-opposite segments $f\ f$, forming said commutator. This commutator F, as well as the above-mentioned commutator E, will be fully described hereinafter.

The rings A A A of the revolving armature, of which any number may be used, as may be desired, are fastened in any suitable manner on the driving-shaft B of the machine, and are spaced thereon so as to allow of the interposition between each pair of the same of the annular plates C C C, a series of which form the field-magnets shown in Fig. 2. These plates are composed of semicircular segments, each of which is provided on its opposite ends with a flange, $c$. These flanges are centrally perforated to receive the bolt $c'$ by means of which and of the threaded nut $c^2$, the plates are fastened together. A series of rectangular grooves are formed on both faces of these plates C C, as well as on the inner and outer rim, and in these grooves are wound the wire-bobbins $c^4\ c^4$ of the field-magnets; and projecting on each side of said plates C are the extensions $c^5\ c^5$, the lower outer edge of which rests on the top edge of the pedestal bracket $C^2$, whereon they are firmly held in place by means of the bolts $c^6 c^6$, and which is itself suitably fastened on the upper face of the bed-plate D of the dynamo-machine. The extensions $c^5\ c^5$ are made so as to project beyond each face of the plate C by as much as will cover half of the space left between each pair of plates for the armature-rings A A. They thus form a continuous line, as shown; and over these extensions is fitted a rectangular soft-iron frame, $C^3$, provided with a flange, $c^7$, projecting at right angles to and along its upper and lower faces and on both edges of it, these flanges $c^7\ c^7$ forming a rectangular groove all around the frame, in which are wound the wire coils $c^8\ c^8$, these latter, together with the wire-coils $c^4\ c^4$ wound in the rectangular grooves of the circular plates C C, being designed to form the two double poles of the field-magnets, in close proximity with the faces of which the rings A A A of my revolving armature are interposed.

Fastened in any suitable manner around the driving-shaft B, at a proper distance in front of the rings A A of the revolving armature, is the commutator E of the exterior current. This commutator is composed of twelve separate rings of metal, $e\ e\ e$, each consisting of two nearly-semicircular segments, whose ends are divided on one side by a space filled up by a piece of metal, $e^2$, insulated by an air-space, $e^3\ e^3$, from each of said segments. The opposite ends of said segments are separated only by an air-space, $e^4$. Both segments of each of the metal rings $e\ e$ are held in place by means of india-rubber disks $e'\ e'\ e'\ e'$, shaped so as to be slipped side by side on the shaft B, and so that between the outer suitably-thinned portion of each adjoining one the metal rings $e\ e\ e$ may be received, while a flange, $e^6$, formed on each face of said disk $e'$, will embrace the outer edge of said metal rings $e$, which they not only serve to maintain in place, but also insulate from each other. The outer rim of the rings $e$, as well as that of the insulating metal piece $e^2$, are grooved at $e^7\ e^7$ to receive the inner ends of the commutator-brushes $e^8 e^8$. These brushes, an enlarged view of which is shown in Fig. 14, are made of a thin copper plate of suitable length bent so as to form an eye, $e^9$, through which a screw, $e^{10}$, is passed to hold said brush in place on the supporting-arms E' E'.

The arrangement of the commutator-rings $e\ e$ around the rubber disks $e'\ e'$ is such that the angular position of each ring of the commutator exactly corresponds with the angular position of the row of bobbins with the wire-conductors of which the ends of said rings are connected. This will cause the ends of each ring to lap beyond the ends of each adjoining ring, all the ends of the rings thus forming a spiral around and along the periphery of the commutator.

The connection between the rings of the commutator E and the wire-conductors of the revolving armature is accomplished by means of the rods $e^{11}\ e^{11}\ e^{11}\ e^{11}$, &c., of suitable length, both ends of which are threaded. One of said ends screws in a threaded perforation made through the ring $e$, which it is intended to connect with the corresponding wire-conductor of the revolving armature. The rod that connects the second ring $e$ with its wire conductor has evidently to be passed through the first ring $e$, the rod of the third ring passing through the second and first rings, and so on with the others, perforations being made for the purpose in said rings.

$E^2$ is a wooden disk which is set between the commutators E and F, and opposite this disk is the stand $E^3$, from which project the arms E' E' to support the brushes of the commutator E. A segmental slot, $e^{14}$, is formed on each side of the stand $E^3$, and the arms E' have their inner ends cut so as to fit squarely in said slot, wherein they are suitably held after proper adjustment by means of binding-screws. These arms E', which are thus maintained parallel to the commutator-axis, are made to support twelve brass rings, $e^{16}\ e^{16}$, each of which is provided with an extension, $e^{17}$, formed in its outer rim. Against this extension rests the upper edge of the commutator-brush, $e^8$, held thereon by means of the binding-screw, $e^{10}$, another extension, $e^{18}$, is also formed on the opposite edge of said rings, and against this is fastened the outer end of the flat springs $e^{19}$. The inner end of said springs bears against the periphery of a roller, $E^4$. This roller, which is supported above the commutator E by means of a binding-screw screwing in the stand $E^3$, extends the whole length of said commutator and carries a series of plates, $e^{21}$, with either of which the inner end of the springs $e^{19}$ may be brought in contact, according to the quantity or intensity it is intended to produce in the electric currents passing through the machine. The peculiar arrangement of these plates $e^{21}$ is clearly illustrated in the diagram of Fig. 9. They are distributed in five rows parallel to the axis of the cylinder, and by means of the contact-springs $e^{19}$ will enable the operator of the machine, as occasion may demand, to unite into groups of two, three, four, six, or twelve the brushes on each side of the commutator. The machine is thus adapted to produce currents of different degrees between the highest intensity and the highest quantity.

F indicates the commutator for the field-magnets, which is composed of the metal rings $f\ f$, of a slightly smaller diameter than those of the commutator E, above described. These rings consist of two semicircular segments separated at both of their adjoining ends by a simple air-space, $f^2$. They are supported and maintained in place in exactly the same manner as in the other commutator by the india-rubber disks $f'\ f'$, and the connection of each of the twelve rings $f$ with the wire conductors of the rings A of the revolving armature reserved for the current of the field-magnets is effected through the rods $f^3\ f^3$ in the same manner as with the rods $e^{11}\ e^{11}$ in the commutator E, the angular position of the rings so connecting corresponding also with the angular position of the ends of the armature-conductors to which they belong.

Twelve pairs of brushes, $e^8\ e^8$, insulated from each other, are mounted on each side of the commutator F, on the rods F' F', projecting from the arms $F^2\ F^2$. Each of these arms is provided with a ring, $f^5$, which is loosely fitted around an extension, $f^6$, formed on the rear face of the bearing-box G, in which is journaled the driving-shaft B of the machine. Projecting downward from the lower edge of each of these rings $f^5$ is another arm, $F^3$, which carries on its end the toothed segment $f^7$. This segment meshes with a similar segment, $F^5$, carried on end of the shaft $F^6$. These shafts $F^6$ are journaled in the box-bearings $f^8\ f^8$, provided for them on the bracket $F^7$, bolted onto the front face of the stand $B^2$ of the machine, and keyed onto the front end of these shafts are the arms $F^8$, the outer ends of which carry toothed segments $f^9$, that mesh with the worm-wheel $F^9$, keyed onto the vertical shaft H. This latter has suitable bearings above and below said worm-wheel $F^9$ in the outer ends of the bracket $F^7$, while the lower end of the shaft H is journaled in the head $i$ of the bracket I, bolted in the bed-plate of the machine. The head $i$ has upward and downward projecting ends $i'\ i^2$, which are turned true to form the bearing studs for the beveled wheels I' $I^2$, which are held in place thereon by means of the rings $i^3\ i^3$, fastened onto the shaft H above and below said wheels by the set-screws $i^4\ i^4$. These wheels are meshed with the vertical bevel-wheel $I^3$, keyed onto the end of the shaft $I^4$, that is suitably journaled in the box of the stand $B^2$.

Between the bevel-wheel $I^3$ and the stand, keyed onto the shaft $I^4$, is a pulley, $I^5$, and this pulley is connected by means of the belt $i^6$ with the pulley $i^7$, carried on the end of the driving-shaft B, which is projected beyond the front face of the stand $B^2$ for that purpose.

Each of the horizontal bevel-wheels I' $I^2$ is provided on its outer face with a ratcheted rim, $i^2\ i^2$. Suspended at a slight distance above the teeth of the ratchet $i^2$ are the clutching ends of the clutch $i^{10}$, attached in any suitable manner to the vertical shaft H. A similar clutch, $i^{11}$, is fastened to the lower end of the shaft H, the clutching ends of which are normally held slightly below the ratcheted rim $i^9$ of the beveled wheel $I^2$. The clutches $i^{10}$ and $i^{11}$ are maintained in this normal position by means of the horizontal lever K, which is fulcrumed in the bifurcated upper end, $i^{12}$, of the bracket I. The short arm of this lever K has its outer end bifurcated at $k$ to embrace the vertical shaft H, whereon it is adapted to work freely against the inner edges of the rings $h$ and $h'$, secured onto the shaft H by means of the set-screws $h^2 h^2$. The opposite end of the lever K is slotted horizontally to receive the flat spring $k^4$ fastened therein, and the opposite end of which is terminated in a pivoting-point to fit in the slightly-hollowed end of the adjusting-screw $k^2$. This latter works in the threaded stud $k^3$, formed on the outer face of the horseshoe-shaped bracket $k'$, fastened on top of the post $k^5$. The screws $k^6 k^6$, working in threaded perforations made in the opposite ends of the bracket $k'$, serve to limit the range of oscillation of the lever K. This oscillation of the lever K is produced every time that, for some cause or other, the electric current induced through the machine has become either too strong or too weak for the work it has to perform. An armature, $k^7$, suitably connected to the lever K and projecting horizontally at right angles on each side of the same, is attracted to either one of the poles $l\ l'$ of two opposite electro-magnets, L L', suitably mounted on the block M. These electro-magnets are connected in any suitable manner to the current-equalizer or governor proper, which consists of the armature-wheel $m$, pivoted on the vertical stem $m'$, fastened in the block M. The flanged base of this stem is extended on one side to form the bracket $m^2$. The armature-wheel $m$ has extensions $m^3 m^4$, projecting diametrically on its outer rim, and a segment, $m^5$, is fastened around the wheel $m$ on each side of the extensions $m^3 m^4$. The segment lying opposite the bracket $m^2$ has a vertically-slotted stud, $m^6$, formed in the center of its outer rim, and in its slot is received the inner end of the flat spring $m^7$, fastened therein. The free end of this spring is terminated in a pivoting-point to fit in the slightly-hollowed end of the adjusting-screw $m^8$, working in the threaded perforation in head of bracket $m^2$. The segment $m^5$ on the opposite side of the armature-wheel $m$ is also provided on its center with a stud, $m^9$. The normal position of this stud $m^9$ is midway between the points of the screws $m^{10} m^{10}$, working in the threaded upper end of the brackets $m^{11} m^{11}$, fastened in the upper face of the block M. These screws serve to limit the range of the armature-wheel $m$ as it is attracted by either one of the poles $n\ n$ of the permanent steel magnet N N or of the poles $n'\ n'$ of the electro-magnet N' N'. Both of these magnets are mounted in any suitable manner in the block M, and the distance between their respective poles is such that the extensions $m^3 m^4$ of the armature-wheel cannot be brought near enough to either of said poles to form a close contact with them.

The permanent steel magnets N N and the electro-magnets N' N' are adjusted in a manner to have equal force for a current of such power as is usually wanted in the machine. To secure such adjustment, the exterior current is divided into two branches, one branch of which circulates through the armature-wheel $m$, while the other is connected with any suitable form of rheostat. This latter is shown as located opposite the governor in Fig. 1, and by its means the current may be modified in such a manner as to pass in a greater or smaller quantity, as required, by including or inserting more or less resistance-wire, whereby the current which is circulated through the armature-wheel will be modified in the same manner. The moment a variation occurs in the exterior current the armature-wheel $m$ is attracted either to the poles of the steel magnet N or to those of the electro-magnet N'. If the attraction is to the permanent steel magnet N, this will show that the electric current circulating through the machine is not of sufficient strength, and will direct current through the electro-magnet L L, above described. The armature $k^7$ of the lever K will be attracted to the poles $l\ l$, depressing the inner end of said lever against the spring $k^4$, and consequently raising the outer bifurcated end of the same, and therewith the vertical shaft H. This will bring the lower clutch, $i^{11}$, of said shaft H in engagement with the ratcheted rim $i^9$ of the beveled wheel $I^2$. To the shaft H will thus be imparted the motion of said wheel $I^2$, the worm-wheel $F^9$, revolving with the shaft H, will cause the downward depression of the toothed segments $f^9 f^9$, while the segments $F^5 F^5$ and $f^7 f^7$ will be moved inward and the arms $F^2 F^2$ will be depressed outward. The rods F' F', which carry the brushes $e^9 e^9$, will in this manner be moved farther apart, and the angular space between the sliding ends of the same—that is, that part of the commutator-periphery which passes between the ends of the brushes—will be increased accordingly; consequently the angular part of rotation—in which opposite brushes touch but one of the semicircular segments of the commutator, and during the passage of which the circulation of the current is suspended—will be decreased and more electricity will be produced. When the equilibrium is re-established in the current, the armature-wheel $m$ of the governor being no more attracted to the steel magnet N, the lever K returns to its normal position on its spring $k^4$. The clutch $i^{11}$ is disengaged from the ratcheted rim of the wheel $I^2$, and the motion of the shaft H and connecting-segments is arrested. Obviously, if the current flowing through the machine is stronger than necessary, the armature-wheel $m$ will be attracted to the poles of the electro-magnet N' N'. These being connected to the electro-magnets L' L', the armature $k^7$ of the lever K will be attracted to their poles $l'$ $l'$, depressing the shaft H and engaging the clutch $i^{10}$ with the beveled wheel I'. This latter revolving in a direction opposite of that of the above-mentioned wheel $I^2$, the worm-wheel $F^9$ on said shaft H will impart an upward motion to the segments $f^9$ $f^9$, and through their connections the rods F' F' will be moved inward, carrying the brushes' ends nearer to each other and causing a decrease in the circulation of the current to re-establish the equilibrium.

Having thus described my invention, what I claim as new, and desire to secure by Letters Patent, is—

1. In a dynamo-electric machine, an armature consisting of a series of flat rings, each having twelve opposite pairs of grooves adapted to receive the bobbins, in combination with a commutator and a switch consisting of a cylinder having plates on its periphery, and springs connected with the commutator-brushes, by means of which the terminals of the bobbins in each row parallel to the axis of the machine are connected in single circuit or in groups of two, three, four, six, or twelve when currents of greater or smaller intensity are desired, substantially as set forth.

2. A dynamo-electric machine having field-magnets consisting of a series of suitably-connected flat rings, forming a cylinder, with ring-shaped spaces to receive the similarly-shaped parts of the revolving armature, said rings being surrounded with wire and having diametrically-opposite extensions to support them and form compact rectangular cores, surrounded also with wire, whereby two double poles are secured, in which the maximum of magnetism is concentrated in close proximity to the revolving armature of the machine, substantially as set forth.

3. In a dynamo-electric machine, the combination, with an armature having numerous bobbins and the commutator connected therewith, of springs connected with the commutator-brushes, and a switch having plates arranged for various conditions of multiple arc and multiple series adapted to move in contact with said springs, whereby the armature-bobbins may be variously grouped while the machine is in action.

4. In a dynamo-electric machine, a commutator composed of semicircular segments of rings suitably insulated from each other, and each having an outer channeled rim to receive the ends of the brushes, in combination with a corresponding number of brushes formed of copper springs and adapted to slide in and come in full contact with the sides of channeled rims of the commutator-rings, substantially as and for the purpose set forth.

5. In a dynamo-electric machine, a commutator having semicircular segments of rings provided with an outer channeled rim to receive the ends of the brushes, substantially as set forth.

6. In a dynamo-electric machine, a commutator for the field-magnet current, provided with a worm-wheel, toothed segments in mesh therewith, the arms of said segments being keyed on the ends of shafts whose other ends carry other toothed segments, other toothed segments in mesh with those last named, and brush-holders actuated by the last-mentioned segments, whereby the brushes of the said commutator are adapted to be moved in different positions to temporarily exclude part of the armature-conductors from activity, and to thereby increase or diminish the power of the field-magnets and regulate the exterior current, substantially as set forth.

7. In a dynamo-electric machine, in combination with a commutator adapted to control the current for the field-magnets, a regulating mechanism consisting of the brush-holders mounted on each side of the commutator on rods projecting from arms provided with rings loosely fitted around an extension formed on the rear face of the driving-shaft box, said rings having downward-projecting arms carrying toothed segments, shafts carrying arms with toothed segments at each end, those at one end being in mesh with the segments just named, and those at the other end meshing with a worm-wheel keyed on a vertical shaft, whereby the power of the said current may be increased or diminished as desired, substantially as set forth.

8. In a dynamo-electric machine, in combination with the commutator for the field-magnet current, a permanent steel magnet, and an electro-magnet, a governor consisting of an armature-wheel adapted to vibrate between the poles of the permanent steel magnet and those of the electro-magnet, and to be attracted to either of said poles according to the deviation of the current above or below the point desired, electro-magnets whose circuits are controlled by the vibrating armature-wheel, and mechanism operated by said electro-magnets, whereby the brushes of the latter are moved in one or the other direction to either strengthen or weaken the current in the machine, substantially as set forth.

In testimony that I claim the foregoing I have hereunto set my hand, at Milwaukee, in the county of Milwaukee and State of Wisconsin, in the presence of two witnesses.

CHARLES L. FR. MUELLER.

Witnesses:
S. S. STOUT,
H. G. UNDERWOOD.